Sept. 3, 1957 N. D. GIGLIOTTI 2,804,844
FEEDING DEVICE
Filed May 6, 1955
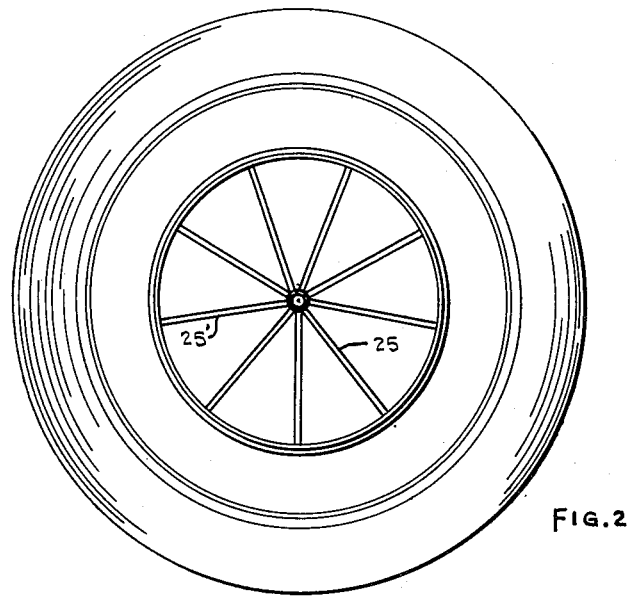
FIG. 2
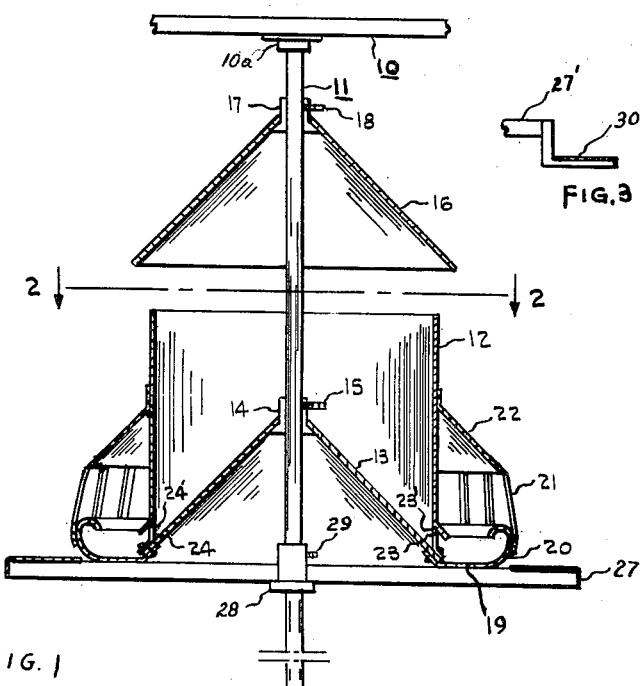
FIG. 3
FIG. 1
INVENTOR.
Nicola D. Gigliotti
BY
Clyde H. Haynes
his attorney

United States Patent Office 2,804,844
Patented Sept. 3, 1957

2,804,844

FEEDING DEVICE

Nicola D. Gigliotti, South Amherst, Ohio

Application May 6, 1955, Serial No. 506,528

3 Claims. (Cl. 119—53)

This invention relates to feeding devices.

Many feeders have been designed in the past which have a hopper and a feed pan for feeding pigeons and other similar birds and fowl. Many of these feeders also have some type or other shields and guards to prevent the pigeons from contaminating the feed in the hopper. However, none of these prior devices have the simple construction and advantages of the present device.

One of the objects of the invention is to provide a feeder in which the hopper encircles a standard so that the feeder may be supported at any elevation above the floor, thereby preventing contamination of the food by rats, mice, and other pests.

Another object of the invention is to design such a feeder which can be easily disassembled, cleaned and serviced.

A further object of the invention is to provide a pigeon feeder with guards and shields which can prevent pigeons from contaminating the feed.

Other objects and a fuller understanding of the invention may be had by referring to the following description and claims, taken in conjunction with the accompanying drawings in which:

Figure 1 is a sectional view of the feeder with the cap raised.

Figure 2 is a view taken along the line 2—2 of Figure 1, and

Figure 3 is a fragmentary sectional view illustrating an alternate platform design.

The bird feeder is illustrated in Figure 1 as hanging from a ceiling 10 on a standard 11 which may be secured to the ceiling 10 by any suitable means such as the flanged bracket 10a illustrated. The standard 11 may be a piece of pipe or a shaft of any suitable material which preferably has a cylindrical smooth surface so that it can become a part of the feeder.

Encircling the standard is a cylindrical hopper 12 which has a conical bottom 13 slidable on the standard 11. As is illustrated in Figure 1 this conical bottom is positioned to peak at the standard 11 so that feed in the hopper and on the conical bottom 13 will slide outwardly to the perimeter of the hopper 12. The conical bottom 13 has a sleeve 14 provided with a thumb screw 15 removably securing the bottom 13 and thus the hopper 12 to the standard 11 at a predetermined position.

The top of the cylindrical hopper 12 is closed by a conical lid 16 which is similar in construction to the conical bottom 13. This conical lid 16 has a lid sleeve 17 provided with a thumb screw 18 for removably securing the lid to the standard and against the top of the hopper to close the same. As is illustrated in Figure 1 this thumb screw may be tightened to hold the lid at an elevated position above the hopper for servicing of the hopper.

Encircling the hopper 12 is an annular feed pan 19 which is secured to the hopper 12. This annular feed pan has a peripheral wall 20 curved upwardly and inwardly towards the hopper. This peripheral wall thus provides an inturned lip which prevents spilling of feed as the pigeons are eating the feed from the pan. Extending upwardly from the peripheral wall is a perforated guard through which the pigeon sticks his head to get the feed from the pan 19. In actual use the annular pan 19 is in a horizontal position and the guard means 21 extends upwardly in a nearly vertical position. The top of the guard 21 is covered by a frustro conical hood 22 which is covered by and encircles the hopper 12. This hood encircles the hopper at a position between the lid and the bottom and engages the guard to keep the pigeons from sitting on the guard and contaminating the feed in the pan.

The bottom of the outer wall of the hopper 12 has openings such as openings 23 and 24 therein, next adjacent the bottom 13 to form a feed passage from inside the hopper into the pan. Actually each of these openings was formed from punching the tabs such as tabs 23' and 24' from the wall. The tabs extend outwardly into the feed pan and can be pushed or bent to open or close the effective size of their respective opening to regulate the flow of feed therethrough. For example peas, wheat, corn, and meal, each require a different size opening. Many times it is desired to make the hopper of the cafeteria style. This is easily accomplished by inserting dividers such as dividers 25 and 25' in the hopper. These dividers may be of any suitable construction so that they will separate the various feeds whereby a particular feed passes from its compartment in the hopper to its particular section in the pan.

The feeder also has a platform 27 provided with a sleeve 28 and a screw 29 for slidably, removably, securing the platform to the standard 11. The platform 27 is annular in shape and provides a platform encircling the feeder on which the pigeons sit while eating. The platform may be secured to the hopper 12 or feed pan 19 if desired and when secured thereto will help steady and stiffen the whole feeder.

Although the feeder has been illustrated in Figure 1 as hanging from the ceiling it is understood that the standard 11 may be secured to either the ceiling or the floor or both. After the hopper 12 and the platform 27 are secured to the standard 11 as hereinbefore described at a desired distance from the floor, feed is placed in the hopper through the top and the lid 16 placed thereover. The feed passes from the hopper through respective openings 23 and 24 into the feed pan from where it is eaten by the pigeons.

The same feeder may be used for feeding other birds and fowl by substituting a platform having an off-set step such as the step 30 in Figure 3. This step 30 in Figure 3 is secured to the cross-bracing 27' which forms a part of the platform and effectively lowers the platform relative to the feed pan as compared to Figure 1.

In either design the feeder device provides a very sanitary time saving feeder which prevents waste of feed and keeps pests out of the feed. This feeder which can handle one or more types of feed simultaneously is filled periodically and automatically supplies the feed to the pigeons or other fowl as it is eaten.

Although the invention has been described with a certain degree of particularity in its preferred form, it is understood that the present disclosure of the preferred form has been made only by way of example and that numerous changes in the details of the construction and arrangement of parts may be resorted to without departing from the spirit and the scope of the invention as hereinafter claimed.

What is claimed is:

1. A bird feeder comprising, a standard having a preset length, a cylindrical hopper encircling the standard and having a conical bottom slidable on the standard, said hopper having a length less than said preset length, a thumb screw in the bottom removably securing the bottom to the standard, a conical lid slidable on the standard and having set screw means tightenable against the standard for removably securing the lid to the standard at a desired position there-along and against the hopper to close the same, an annular feed pan engageable with and encircling said hopper and having a peripheral wall curved upwardly and inwardly towards said hopper, perforated guard means on said wall and extending upwardly therefrom, and a somewhat frustro conical shaped hood encircling the hopper at a position between the lid and the bottom and engageable with said guard, said hopper having openings therein next adjacent the bottom to form a feed passage from inside the hopper into the pan, platform means encircling said pan and adjustably supported by said standard, whereby one or more of said hopper and said lid and said feed pan and said platform may be temporarily moved along the standard to permit cleaning of the parts.

2. The structure of claim 1 including said hopper having bendable tabs at said openings to control the effective size of the opening to regulate the flow of feed therethrough.

3. The structure of claim 1 including vertical dividers in said hopper extending radially from the standard to the hopper to divide the hopper into sections for different types of feed.

References Cited in the file of this patent

UNITED STATES PATENTS

| | | |
|---|---|---|
| 312,462 | Harman | Feb. 17, 1885 |
| 829,611 | Turner | Aug. 28, 1906 |
| 1,520,607 | Smith | Dec. 23, 1924 |
| 1,759,320 | Mosel | May 20, 1930 |
| 1,785,782 | Markey et al. | Dec. 23, 1930 |
| 2,273,616 | Beatty | Feb. 17, 1942 |
| 2,277,420 | Stanfield | Mar. 24, 1942 |
| 2,503,886 | Olson | Apr. 11, 1950 |
| 2,591,126 | Breck | Apr. 1, 1952 |